United States Patent [19]
Hynes

[11] 3,938,229
[45] Feb. 17, 1976

[54] SCREW MACHINE CUT-OFF TOOL

[75] Inventor: Charles P. Hynes, Rockaway Park, N.Y.

[73] Assignee: The Raymond Lee Organization, Inc., New York, N.Y., a part interest

[22] Filed: Nov. 26, 1974

[21] Appl. No.: 527,217

[52] U.S. Cl. .................................................. 29/96
[51] Int. Cl.² .......................................... B26D 1/00
[58] Field of Search .................. 29/96, 97.5, 95

[56] References Cited
UNITED STATES PATENTS

| 2,419,081 | 4/1947 | Messenger | 29/96 |
| 2,676,386 | 4/1954 | May | 29/96 |
| 3,172,191 | 3/1965 | Schoffel et al. | 29/96 |

FOREIGN PATENTS OR APPLICATIONS

| 1,151,709 | 7/1963 | Germany | 29/96 |
| 171,530 | 3/1960 | Sweden | 29/96 |
| 1,360,269 | 3/1964 | France | 29/96 |
| 150,429 | 3/1953 | Australia | 29/96 |
| 1,442 | 1/1915 | United Kingdom | 29/96 |

Primary Examiner—Harrison L. Hinson
Attorney, Agent, or Firm—Howard I. Podell

[57] ABSTRACT

A parting tool for cutting off stock lengths on a lathe or screw machine which supports the cutting blade in tension, thus enabling the use of a narrow cut-off blade that can cut larger diameter stock than conventional cut-off tools. The cutting blade is mounted in slots of the two arms of a Y-shaped holder, with the cutting edge located between the holder arms. The blade is anchored to the holder by a support pin that engages an open slot in the rear blade edge, and by cammed pins in the holder arms, locking in the front edge of the blade.

2 Claims, 2 Drawing Figures

SCREW MACHINE CUT-OFF TOOL

SUMMARY OF THE INVENTION

My invention is a parting tool for cutting off stock lengths on a lathe, screw machine or cut-off machine which supports the cutting blade in tension, thus enabling the use of a narrow cut-off blade that can cut larger diameter stock with less waste of material.

The cutting blade is mounted in slots of the two arms of a Y-shaped holder, with the cutting edge centrally located between the holder arms.

The blade is anchored to the holder by support pins that engage an open slot in the rear blade edge, and by cammed pins in the holder arms which lock in the front edge of the blade.

Since the cutting blade is supported in tension, it may be formed of narrower stock than conventional cut-off tools that are conventionally sheer or compression mounted to their holders, thus forming a narrower and more economical cut of stock. The increased strength of the blade, due to the tension mounting, coupled with the narrow width of cut, enables the screw machine to take a deeper cut on each turn of the stock than with conventional tools and to cut larger diameter stock. The suspension of the cutting blade reduces the deflections associated with conventional blades and mountings.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
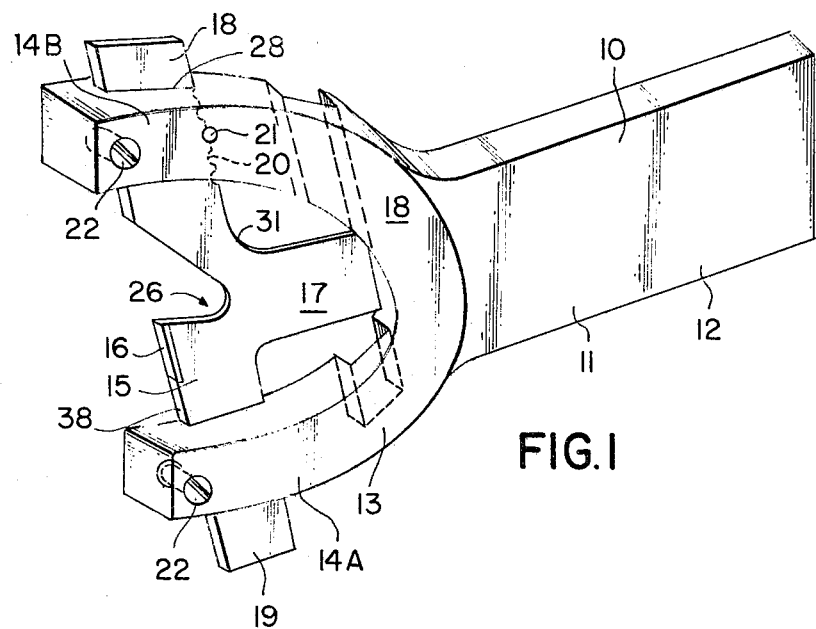
FIG. 1 is a perspective view of the parting tool of the invention.
Figure 2:
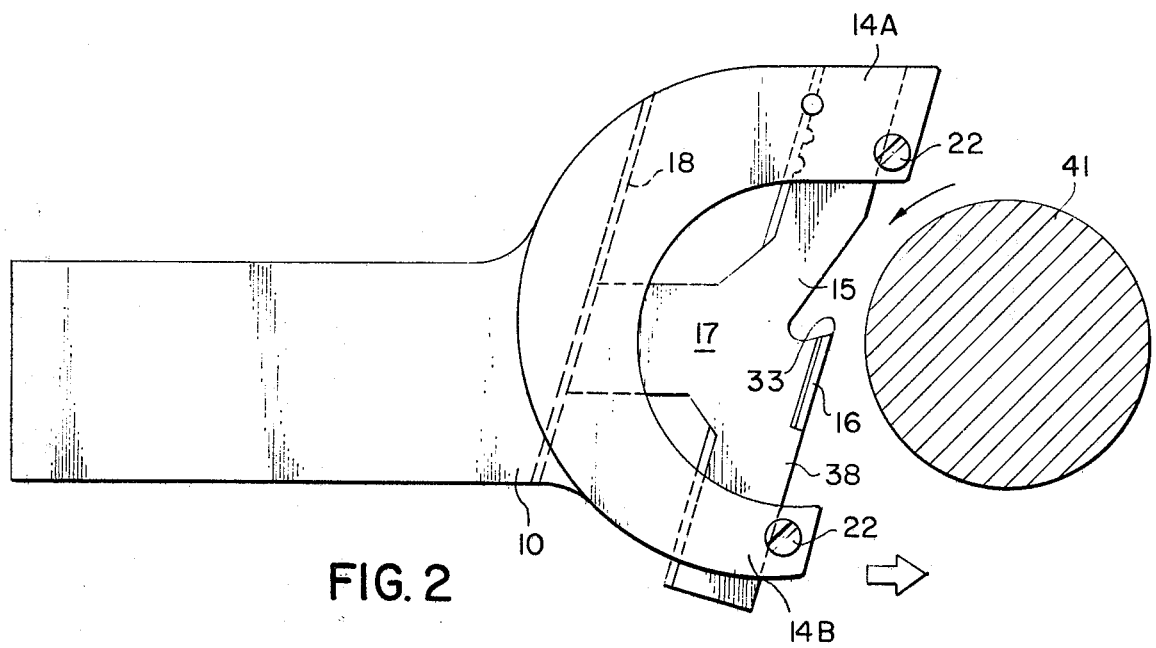
FIG. 2 is a side view of the parting tool and stock to be cut.

Turning now descriptively to the drawings, in which similar reference characters denote similar elements throughout the several views, FIGS. 1-2 illustrate the parting tool 10 which is formed of a holder 11 and an attached blade 15.

Holder 11 is shaped with a conventional shaped shank 12 for fitting into a screw machine tool holder (not shown), with shank 12 joined to two spaced apart arms 14A and 14B.

Cut-off blade 15 is mounted to the two arms 14A and 14B so that blade 15 is maintained in tension. Blade 15 may be fitted with a brazed carbide cutting insert 16, a shaped clearance opening 26 about the cutting insert 16 as required. A stiffener 17 extends behind the cutting insert 16 to back against a flat edge 18 of a dovetail slot cut into the holder 11.

Each end 18 and 19 of the blade 15 is anchored securely to an arm 14B and 14A respectively of the holder 11 fitting into a slot 28 cut in the arms 14B and 14A. The rear edge 31 of the blade 15 is fitted with grooves 20, one of which is engaged by a pin 21 fitting through a hole in the upper holder arm 14B so as to locate the cutting edge 16 at the center line of the stock 41 and provide a tension anchor when the point 33 of the cutting edge 16 of the blade is engaged in cutting a length of stock 41. The blade 15 is also anchored in each arm 14A and 14B by a camming screw 22 mounted in each arm that bears against the forward edge 38 of the blade 15 and forces the back edge 39 of the stiffener 17 into engagement with the edge 18 of the slot in the holder 11.

Since the cutting point 33 of the blade is supported in tension from pin 21 anchored in upper arm 14B, the blade 15 may be thinner than conventional sheer or compression supported blades and may cut to the center of larger diameter stock than conventional cut-off tools.

Holder 12 may be fitted with a shank shaped for mounting in a multiple quick change tool post.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A screw machine cut-off tool in which the cutting point of the tool blade is supported in tension, comprising a removable tool blade, formed with two arm sections joined to a stiffener section, a blade holder formed with a shank joined to two separated arm members, with fastening means to frictionally mount each arm member of the blade holder to an arm section of the blade, said tool blade fitted with a cutting point located between the two arm sections of the blade with the stiffener section extending from the rear portion of the blade opposite the cutting point on the forward end of the blade, said blade holder and said blade fitted with adjustable mating means to positively engage a first arm member of the blade holder with a first arm section of the blade, with the second arm member of the blade holder being frictionally engaged to the second arm section of the blade, said first arm section of the blade being oriented with respect to the cutting point of the blade in the same direction as the relative direction the cutting point moves toward work to be cut so that the engaged positive said mating means applies a tension force to said first arm section of the blade in use, said blade holder fitted with bearing means to slidably support the end of the stiffener section of the blade.

2. The combination as recited in claim 1 in which the mating means for engagement of the first arm member of the blade holder and the first arm section of the blade comprises a plurality of grooves on an edge of the blade, with a pin fitted in the blade holder of a size to fit in one of the grooves of the blade, so that the blade may be alternately located in one of a plurality of positions with regard to the blade holder.

* * * * *